(12) United States Patent
Brown et al.

(10) Patent No.: US 12,392,537 B2
(45) Date of Patent: Aug. 19, 2025

(54) AUTOMATED STORAGE AND RETRIEVAL SYSTEM AND MICROCLIMATE-CONTROLLED RECEPTACLES FOR PHARMACEUTICALS AND METHOD FOR OPERATING SAME

(71) Applicant: Dematic Corp., Grand Rapids, MI (US)

(72) Inventors: Adam Brown, Indian Trail, NC (US); Joon W. Choi, Carrollton, TX (US)

(73) Assignee: Dematic Corp., Grand Rapids, MI (US)

( * ) Notice: Subject to any disclaimer, the term of this patent is extended or adjusted under 35 U.S.C. 154(b) by 187 days.

(21) Appl. No.: 18/161,629

(22) Filed: Jan. 30, 2023

(65) Prior Publication Data

US 2023/0243567 A1 Aug. 3, 2023

Related U.S. Application Data

(60) Provisional application No. 63/304,974, filed on Jan. 31, 2022.

(51) Int. Cl.
*F25D 13/00* (2006.01)
*B65G 1/04* (2006.01)
(Continued)

(52) U.S. Cl.
CPC ............ *F25D 13/00* (2013.01); *B65G 1/0421* (2013.01); *B65G 1/045* (2013.01); *B65G 1/0478* (2013.01);
(Continued)

(58) Field of Classification Search
CPC ........ F25D 13/00; F25D 29/00; F25D 29/005; F25D 2700/12; B65G 1/021; B65G 1/045;
(Continued)

(56) References Cited

U.S. PATENT DOCUMENTS

| | | | |
|---|---|---|---|
| 8,983,647 B1 | 3/2015 | Dwarakanath et al. | |
| 9,008,827 B1 * | 4/2015 | Dwarakanath | F25B 27/00 700/214 |

(Continued)

FOREIGN PATENT DOCUMENTS

| | | |
|---|---|---|
| CN | 109502220 A | 3/2019 |
| CN | 110884819 A | 3/2020 |

(Continued)

*Primary Examiner* — Marc E Norman
(74) *Attorney, Agent, or Firm* — Gardner, Linn, Burkhart & Ondersma LLP (57) ABSTRACT

An automated warehouse system and method for climate controlled storage and order fulfilment comprises a control system, an automated storage and retrieval system ("ASRS") with a storage rack defining storage locations for storage receptacles for containing goods, where either at least some of the storage receptacles are individually temperature controllable or the storage rack is at least partially disposed in a frozen environment. A transportation system is coupled with the ASRS for transporting storage receptacles to and from the automated storage and retrieval system, and a workstation is in communication with the transportation system for picking goods to a temperature-controlled order receptacle. The control system directs order fulfilment operations comprising directing goods requiring stable temperature control from the ASRS to the workstation and directs an operator to pick the goods from the storage receptacle to the temperature-controlled order receptacle to maintain the goods within a required temperature range.

20 Claims, 6 Drawing Sheets

(51) Int. Cl.
*B65G 1/137* (2006.01)
*F25D 29/00* (2006.01)

(52) U.S. Cl.
CPC ............ *B65G 1/1375* (2013.01); *F25D 29/00* (2013.01); *B65G 2201/027* (2013.01); *F25D 2700/12* (2013.01)

(58) Field of Classification Search
CPC ................ B65G 1/0478; B65G 1/1375; B65G 2201/027; G06Q 10/08; G06Q 10/087
See application file for complete search history.

(56) References Cited

U.S. PATENT DOCUMENTS

| | | |
|---|---|---|
| 10,819,126 B2 | 10/2020 | Hognaland et al. |
| 11,067,329 B2 | 7/2021 | Boer et al. |
| 2011/0202170 A1 | 8/2011 | Dawes et al. |
| 2018/0058739 A1* | 3/2018 | Zou .......................... F25B 49/00 |
| 2020/0071076 A1 | 3/2020 | Fosnight et al. |
| 2020/0317445 A1* | 10/2020 | Schultz ................ B65G 1/1371 |
| 2021/0199353 A1 | 7/2021 | Edwards et al. |
| 2022/0327602 A1* | 10/2022 | Martin ................. G06Q 10/087 |
| 2023/0028034 A1* | 1/2023 | Gravelle .............. B65G 1/0485 |
| 2023/0085105 A1* | 3/2023 | Edwards ................ B65G 1/137 700/214 |

FOREIGN PATENT DOCUMENTS

| | | |
|---|---|---|
| EP | 3844084 A2 | 7/2021 |
| JP | 2008179474 A | 8/2008 |
| JP | 2009050076 A | 3/2009 |
| WO | 2018073392 A1 | 4/2018 |
| WO | 2019001816 A1 | 1/2019 |
| WO | 2021148642 A1 | 7/2021 |
| WO | 2021257563 A2 | 12/2021 |

\* cited by examiner

AUTOMATED STORAGE AND RETRIEVAL SYSTEM AND MICROCLIMATE-CONTROLLED RECEPTACLES FOR PHARMACEUTICALS AND METHOD FOR OPERATING SAME

CROSS REFERENCE TO RELATED APPLICATION

The present application claims priority of U.S. provisional application Ser. No. 63/304,974 filed Jan. 31, 2022, which is hereby incorporated herein by reference it its entirety.

FIELD OF THE INVENTION

The present invention is directed to the storage and transport of cold goods, and in particular the storage and transport of pharmaceuticals.

BACKGROUND OF THE INVENTION

Some pharmaceuticals, such as vaccines and insulin, require temperature-controlled storage, handling, and transportation, otherwise commonly referred to as pharmaceutical cold chain transportation. Temperature-controlled transport of sensitive pharmaceuticals poses many challenges including safety for operators, administrators, and patients, security of the pharmaceuticals, and the temperature parameter or requirements for some pharmaceuticals, which may require temperature of below −20° C. Medical centers, including primary care clinics, specialized clinics, rural health clinics, vaccination offices, hospice homes, and mobile clinics, etc. are commonly without adequate freezer storage capacity in the facility and may have no freezer storage capacity whatsoever due to space constraints and/or the need to be mobile to reach patients. Pharmaceutical products may be delivered to medical centers in full cases, which may include too much product for a particular medical center to administer before it expires, thereby causing waste.

SUMMARY OF THE INVENTION

The present invention provides a method and system for storing, picking, and delivering pharmaceutical cold chain products. The method provides chain of custody and temperature monitoring to ensure the safety and security of handling temperature-controlled products including pharmaceuticals and complimentary products. The method enables delivery of a sufficient amount of product without the risk of large amounts of waste due to overstocking at point of administration medical centers. The method permits nearly on-demand delivery of pharmaceuticals, include complete pharmaceutical kits (e.g. vaccine kits including syringes, sanitary products, etc.). The system provides relatively small temperature-controlled medical supply storage facility hubs that may be located close to medical centers (e.g. within a one hour radius). Accordingly, medical Centers may place tailored orders based on scheduled, verified, and/or confirmed appointment schedules. Because the expected delivery time of a particular order is within one hour of the storage hub, it is possible to modify or cancel orders up to about two hours from a particular appointment time.

The system utilizes independently temperature-controlled order containers for delivering the pharmaceuticals to medical centers (i.e. last mile delivery). The method enables pharmaceuticals to be delivered to medical centers in batch sizes with quantities less than a full case, thereby substantially reducing or eliminating waste. Less temperature-controlled storage is required at the medical center, which may free up additional space for patient care. The system utilizes automated storage and retrieval systems, which enable medical supplies, including pharmaceuticals, to be segregated and stored per customer/medical center within a single storage hub. The temperature may be monitored throughout the automated storage and retrieval system and/or within each storage receptacle within the hub.

In accordance with an aspect of the present invention an automated warehouse system for climate controlled storage and order fulfilment includes a warehouse control system controlling storage and order fulfilment processes, an automated storage and retrieval system comprising a storage rack defining a plurality of storage locations for a plurality of storage receptacles for containing goods with the storage rack at least partially disposed in a frozen environment, a transportation system coupled with the automated storage and retrieval system and operable to transport storage receptacles to and from the automated storage and retrieval system, and a workstation in communication with the transportation system and configured for picking goods received to a temperature-controlled order receptacle. The warehouse control system is operable to direct order fulfilment operations comprising directing goods requiring stable temperature control from the automated storage and retrieval system to the workstation and operable to direct an operator to pick the goods from the storage receptacle to the temperature-controlled order receptacle in a manner that maintains the goods within a required temperature range.

In a particular embodiment the temperature-controlled order receptacle comprises a cooling system having at least one chosen from a thermoelectric pump, a forced ventilation system, a vapor-compression refrigeration system, and a temperature-controlled fluid distribution system. Still further, the storage rack may be configured to have a plurality of racks that each include a plurality of storage locations for storage receptacles, where some of the racks are disposed in the frozen environment and some of the racks are disposed in an ambient environment.

In accordance with another aspect of the present invention an automated warehouse system for storage of goods at different temperatures comprises a warehouse control system, an automated storage and retrieval system comprising a storage rack defining a plurality of storage locations, and a plurality of storage receptacles configured to be stored at storage locations in the automated storage and retrieval system. A microclimate control system is provided for each of the storage receptacles for monitoring and regulating temperature therein, where each of the microclimate control systems is individually controllable by the warehouse control system. A transportation conveyor system coupled with the automated storage and retrieval system is operable to transport storage receptacles to and from the automated storage and retrieval system, and a workstation is in communication with the transportation conveyor system and configured for picking goods to a temperature-controlled order receptacle. The warehouse control system is operable to maintain and adjust the temperature of each of the storage receptacles stored in the automated storage and retrieval system based on information received from the corresponding microclimate control systems, with the warehouse control system being operable to separately maintain and adjust the temperature of each of the storage receptacles. The warehouse control system is further operable to direct order fulfilment operations comprising directing goods requiring stable temperature control from the automated storage and retrieval system to the workstation and operable to direct an operator to pick the goods from the storage receptacle to the temperature-controlled order receptacle to maintain the goods within a required temperature range.

In a particular embodiment the system further comprises a communication network that is selectively engageable by the storage receptacles at each of the storage locations, where the warehouse control system is operable to adjust the temperature of each of the storage receptacles via a connection between the communication network and each of the microclimate control devices.

In accordance with still another aspect of the present invention, a method for controlling an automated warehouse system having a warehouse control system includes storing goods in a plurality of storage receptacles in an automated storage and retrieval system having a plurality of storage locations for storing storage receptacles, where at least some of the storage receptacles stored at the storage locations are temperature-controlled for storage of goods requiring controlled temperatures, monitoring the temperature of the temperature-controlled storage receptacles with the warehouse control system, and directing an order picking process for a customer order requiring goods from a temperature-controlled storage receptacle. The directing an order picking process further comprises transporting temperature-controlled storage receptacles having goods requiring controlled temperatures that are required for the customer order from the automated storage and retrieval system to a workstation, an operator at the workstation picking the goods requiring controlled temperatures from the temperature-controlled storage receptacles to a temperature-controlled order receptacle in a manner that maintains the goods within a temperature range required for those goods, and transporting the goods for the customer order in the temperature-controlled order receptacle to downstream process in a manner that maintains the goods within a temperature range required for those goods.

These and other objects, advantages, purposes and features of this invention will become apparent upon review of the following specification in conjunction with the drawings.

DESCRIPTION OF THE PREFERRED EMBODIMENTS

Referring now to the drawings and the illustrative embodiments depicted therein, a method 100 is provided for managing and controlling pharmaceutical cold chain fulfillment utilizing temperature-controlled automated storage systems and/or temperature-controlled receptacles or totes for the delivery of temperature dependent and sensitive pharmaceuticals to medical centers (e.g. hospitals, clinics, pharmacies, etc.). An automated warehouse system or storage hub 10 is provided for storing pharmaceuticals requiring temperature-controlled environments until they are ordered by a medical center. The storage hub 10 includes an automatic storage and retrieval system 14 (ASRS), such as a shuttle based storage system, which may include both an ambient 17 and a temperature-controlled storage area 15 (e.g. a freezer). The temperature-controlled cold storage area 15 is separated or isolated from the ambient area 17 of the ASRS 14, such as with insulated partitions or walls. Pharmaceuticals and other goods (e.g. goods complimentary to pharmaceuticals) are stored in storage receptacles or totes 12 within the ASRS 14. Optionally, each tote may be independently temperature-controlled (such as totes 12a or 12b described below) with the ASRS 14 being located in an ambient environment 17. The system and method enable temperature-controlled pharmaceuticals to be delivered to the medical center and stored in a freezer/refrigerator onsite without the need for specialty ultra-low temperature storage systems because the quantity delivered from the storage hub is intended to be consumed within the same day.

Figure 1:
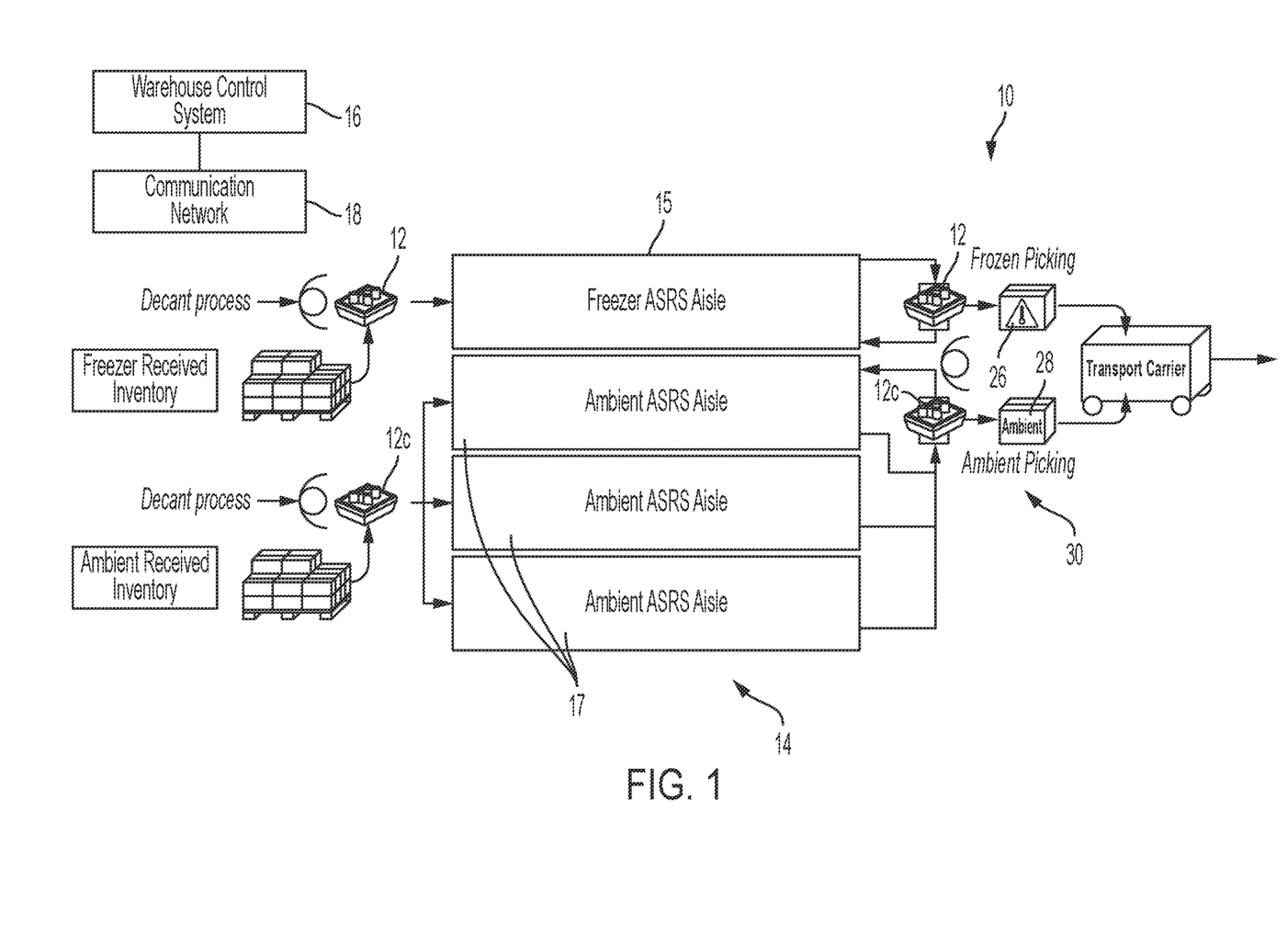
FIG. 1 is a diagram of a storage hub and automated storage warehouse system for the handling, storage, and distribution of cold goods, in accordance with an aspect of the present invention.
Figure 2:
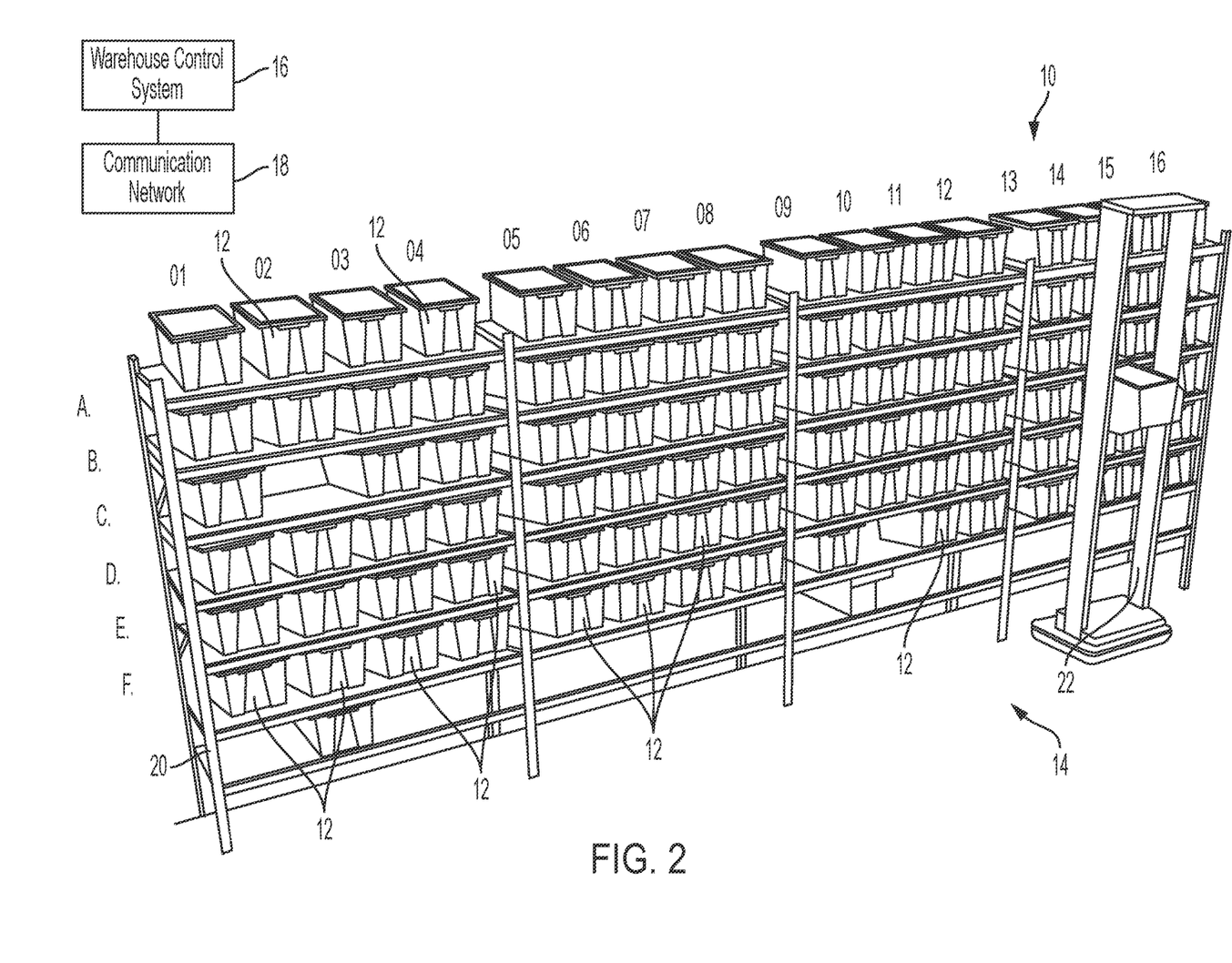
FIG. 2 is a perspective view of an automatic storage and retrieval system of the automated warehouse system of FIG. 1.

Referring now to the illustrative embodiment of FIGS. 1-2, a storage system or hub 10 is provided for the storage of pharmaceuticals at required temperatures to ensure efficacy and freshness of the pharmaceuticals and to reduce or eliminate the potential for the pharmaceutical to expire prior to administration. The hub 10 includes an ASRS 14 having a storage rack 20 with multiple rack levels each defining multiple storage locations for the storage of totes 12. Various systems and methods are contemplated for monitoring and regulating the temperature of pharmaceuticals within the ASRS 14. The ASRS 14, or portions thereof, may be located within a freezer or temperature-controlled enclosure or environment 15. For example, the ASRS 14 may have structure and function substantially similar or identical to the multiple temperature storage systems disclosed in commonly owned and assigned U.S. Pat. No. 11,067,329, issued Jul. 20, 2021 by Dematic Corp. of Grand Rapids, MI, the disclosure of which is hereby incorporated herein by reference in its entirety. The totes 12 may include a wireless temperature sensor or monitor to record and transmit the storage temperatures inside the tote 12 and/or the ASRS 14. Monitoring the internal temperature of the totes 12 ensures that product stored therein does not fall outside of its prescribed temperature parameters, such as while the storage tote 12 is at a workstation (e.g. goods to person pick station) outside of the temperature-controlled environment. If a tote 12 starts to approach an outside bound of the product's temperature parameters, an operator may be alerted at the workstation to take immediate action and return the tote to the temperature-controlled environment. The temperature information of a tote 12 and/or the ASRS 14 may be wirelessly transmitted to a warehouse control system 16 such that it may be tracked and displayed to on-site operators as well as remote users (e.g. staff at a medical clinic ordering or expecting pharmaceuticals from the hub 10).

Figure 3:
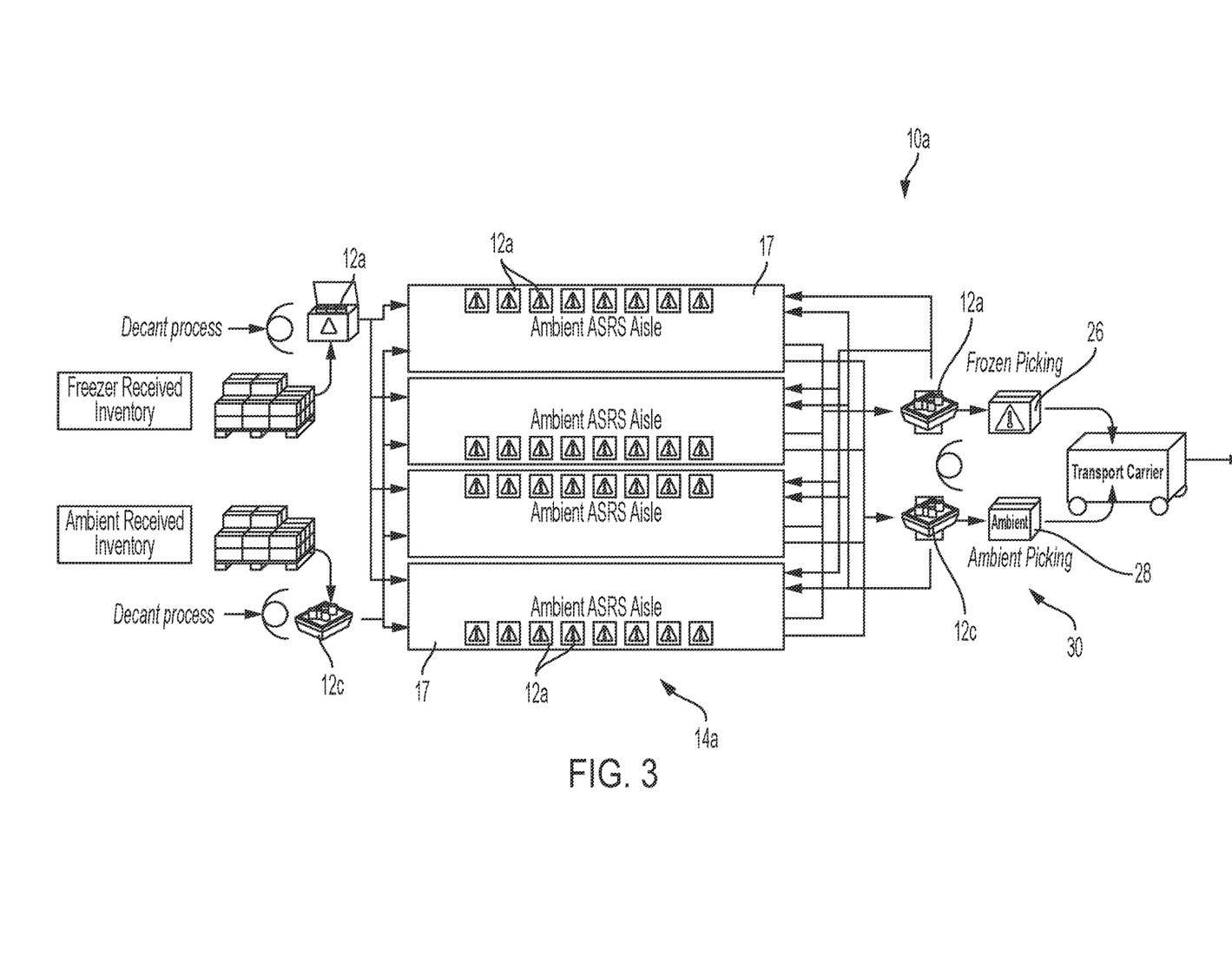
FIG. 3 is a diagram of another storage hub and automated storage warehouse system for the handling, storage, and distribution of cold goods, in accordance with another aspect of the present invention

Alternatively, a storage system or hub 10a that has structure and function substantially similar or identical to that of the storage hub 10 may utilize independently temperature-controlled totes or receptacles 12a operable to monitor and regulate their own microclimate (FIGS. 3 and 4), in contrast to requiring a temperature-controlled environment 15 (e.g. freezer). In such an embodiment, the ASRS 14a may be located in an ambient environment 17 and may have structure and function substantially similar or identical to that of the automated warehouse system disclosed in commonly owned and assigned U.S. Pat. App. Pub. No. US20230242344A1, filed Jan. 30, 2023, and U.S. provisional application Ser. No. 63/304,917, filed Jan. 31, 2022, by Dematic Corp. of Grand Rapids, MI, and entitled AUTOMATED STORAGE AND RETRIEVAL SYSTEM WITH MICROCLIMATE-CONTROLLED RECEPTACLES, the disclosures of which are hereby incorporated herein by reference in their entireties. An example of a cold storage/temperature-controlled tote 12a that is independently operable to control its temperature may include structure and function substantially similar or identical to the storage and transportation cooler disclosed in U.S. Pat. App. Pub. No. 2021/0199353A1, published Jul. 1, 2021 by Phononic, Inc. of Durham, NC, the disclosure of which is hereby incorporated herein by reference in its entirety.

Figure 4:
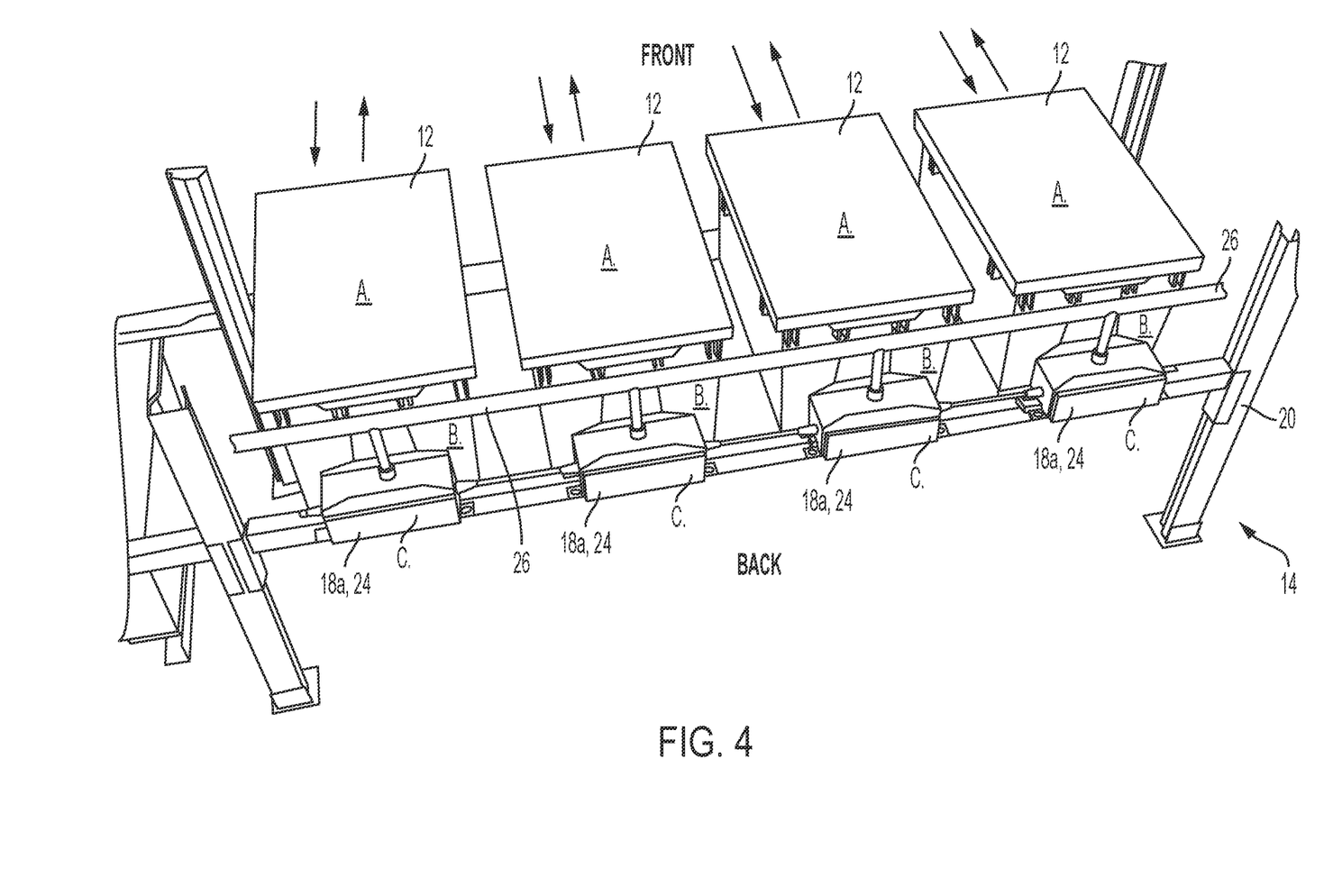
FIG. 4 is a perspective view of portion of an automatic storage and retrieval system of the automated warehouse system of FIG. 1, depicting storage receptacles coupled to a communication and control network, in accordance with the present invention.

The hub 10a may include microclimate or environmental control inputs in addition to temperature controls, which may be provided throughout the ASRS 14a to provide inputs to the totes 12a stored at storage locations in the ASRS 14a. For example, the ASRS 14a may include a communication network 18 in the form of data interfaces 18a at each storage location (FIG. 4). The ASRS 14a may include a power interface 24 to provide electricity inputs to the totes 12a and a fluid distribution system, such as an air/gas delivery network, for delivering fluids to be input into the totes 12a. The environmental control inputs may utilize thermoelectric pumps, forced ventilation, vapor-compression refrigeration, refrigerants, gas control mechanisms, and the like to supply required inputs to the totes 12a based on the requirements of the facility and the goods stored therein. The environmental control inputs may include a controller to control the tote's 12a cooling system based on the temperature at the interior of the tote.

Figure 5:
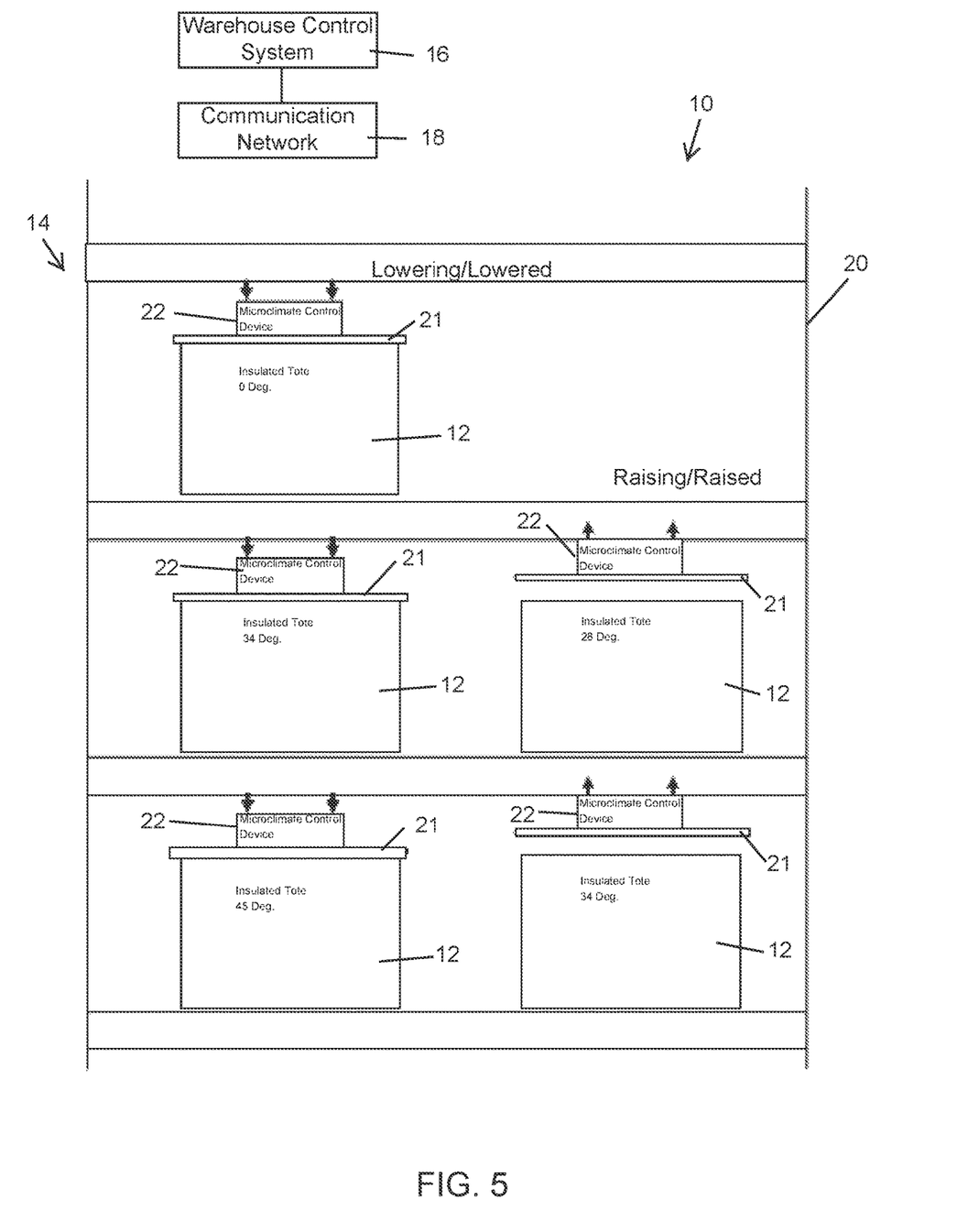
FIG. 5 is an elevation view of another automatic storage and retrieval system of storage hub and automated warehouse system, in accordance with the present invention.

In another alternative, commonly known and commercially available receptacles or totes 12b may be utilized within a system 10b similar to system 10a, such as insulated totes, for example (FIG. 5). An ASRS 14b of system 10b includes storage receptacle or tote lids or covers 21 coupled to a portion of the ASRS 14b at each of the storage locations to seal an open portion (e.g. an open top) of a tote 12b present at a particular one of the storage locations (FIG. 5). A temperature and/or microclimate control device 22 is provided with each cover 21 to provide temperature and/or environmental inputs into the tote 12b when it is stored in the ASRS 14b. For example, the ASRS 14b may have structure and function substantially similar or identical to that of the automated warehouse system disclosed in commonly owned and assigned U.S. Pat. App. Pub. No. US20230242345A1, filed Jan. 30, 2023, and U.S. provisional application Ser. No. 63/304,946, filed Jan. 31, 2022, by Dematic Corp. of Grand Rapids, MI, and entitled RECEPTACLE WITH TEMPERATURE-CONTROLLED LID FOR AUTOMATED STORAGE AND RETRIEVAL SYSTEM, the disclosures of which are hereby incorporated herein by reference in their entireties, Referring to the illustrative embodiment of FIG. 6, a method 100 is provided for controlling the storage hub 10, 10a, or 10b to store pharmaceuticals at temperature-controlled parameters meeting the requirements of the pharmaceuticals stored therein and to retrieve, pick, and subsequently transport the pharmaceuticals to a medical center while maintaining the pharmaceuticals within their required temperature parameters. The method includes storing 102 pharmaceuticals and/or other goods in the ASRS 14 that is located within a temperature-controlled environment 15 (e.g. an ultra-low temperature freezer) and/or within an ambient environment 17 utilizing temperature-controlled totes 12a or 12b. The method 100 includes monitoring 102 the temperature in each of the totes 12 with the warehouse control system 16, such as with wireless temperature sensors or monitors. The warehouse control system 16 directs an order picking process for a customer order that requires temperature-controlled pharmaceuticals. The order picking process includes transporting 104 a tote 12 having required temperature-controlled pharmaceuticals for the customer order from the ASRS 14 to a pickstation 30. An operator at the pickstation 30 picks 108 the temperature-controlled pharmaceuticals from the tote and into a temperature-controlled order receptacle 26 in a manner that maintains the goods within a required temperature range. The temperature-controlled order receptacle 26 may have structure and function substantially similar or identical to the storage and transportation cooler of U.S. Pat. App. Pub. No. 2021/0199353A1, as described above. The temperature-controlled order receptacle 26 may be temperature-controlled by various different cooling/heating mechanisms, such as a thermoelectric pump, a forced ventilation system, a vapor-compression refrigeration system, and/or a temperature-control fluid system, for example. The items are picked 108 in exact (or close to exact) quantities for the medical center's order and the serialization, lot, and expiration data for the picked items is collected and incorporated with the order (such as saved in an order database). Once the order receptacle 26 is packed with all of the required pharmaceuticals and other goods, the order picking process includes transporting 110 the order receptacle 26 to a downstream process and/or to a medical center in a manner that maintains the goods within a temperature range required for those goods.

Figure 6:
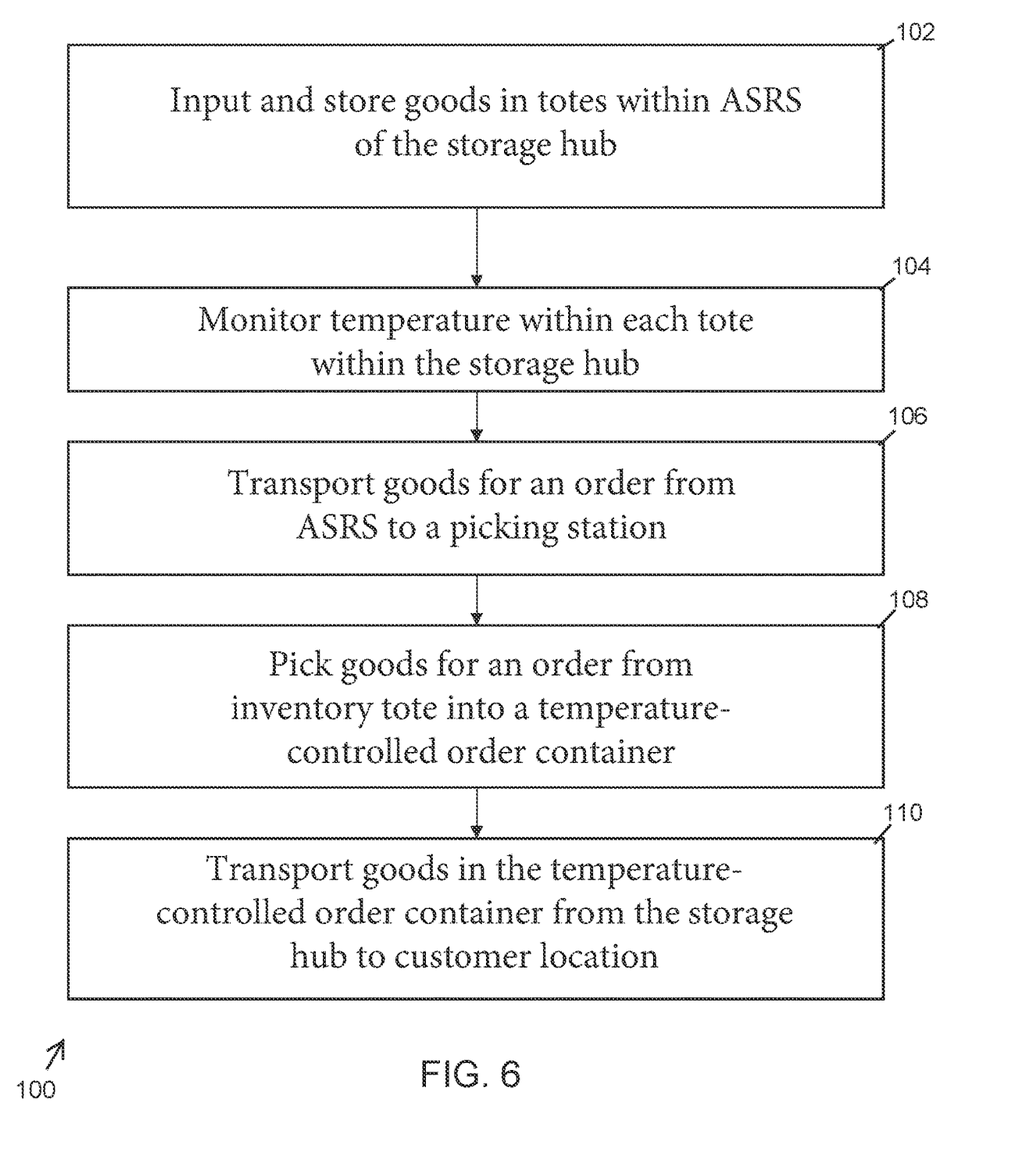
FIG. 6 is a diagram of a method for handling, storage, and distribution of cold goods, in accordance with the present invention.

The most fragile or temperature sensitive ones of the required pharmaceuticals may be retrieved after the less fragile or less temperature sensitive pharmaceuticals such that the most fragile or sensitive are maintained at an ideal temperature for as long as possible and such that they are out of the ASRS 14 for a minimal time prior to being transported to the medical center. The method 100 may include the warehouse control system 16 sequencing multiple customer orders requiring temperature-controlled pharmaceuticals as a function of required delivery times at which the medical center requires their order and/or route and transportation time planning requirements. Particular pharmaceuticals may require complimentary goods, such as syringes, alcohol wipes, etc. that do not require temperature control and may be storable in an ambient environment 17. The method 100 may include transporting complimentary goods from a portion of the ASRS 14 in an ambient environment 17 to the pickstation. The operator picking the complimentary goods from the non-temperature-controlled tote 12c to the order receptacle 26 such that the order receptacle contains both goods requiring temperature control and goods that do not necessarily require temperature control. It will be appreciated that the temperature-controlled pharmaceuticals may be transported to the medical center alone and the complimentary goods transported in a different order receptacle 28 (e.g. a non-temperature-controlled receptacle). The temperature-controlled order receptacle 26 may be sealed with a tamper-resistant device prior to the receptacle leaving the hub 10, such as affixing a unique zip-tie or an electronic locking device to the receptacle. The method may include alerting the customer of the status of their order and providing the customer with real-time tracking information of their order. Chain of custody and temperature monitoring are maintained throughout the order picking and delivery process to ensure that visibility and traceability are maintained at the highest level for safety and security of the pharmaceuticals.

The method 100 and warehouse control system 16 may be operable to control decant operations for inbound pharmaceuticals that require temperature control. For example, when temperature-controlled pharmaceuticals are received at the hub 10 they are immediately entered into the temperature-controlled ASRS 14 and/or into a temperature-controlled storage tote via a deliberate induction process, such as at a decant station dedicated pharmaceutical cold chain handling operations. During the decant process the warehouse control system 16 records all standard characteristics of the decanted product, such as its National Drug Code (NDC), expiration date, lot number(s), specific serial number(s), temperature thresholds/required parameters, etc. The method also tracks the date and time when the product was transferred into and out of the ASRS 14/temperature-controlled storage tote and by which operator in order to maintain a precise chain of custody record. When an order is picked for delivery, the chain of custody is automatically updated during the picking process by the warehouse control system 16. The system may include various safety and security features. For instance, an operator may be required to log into a specific workstation by using standard or biometric credentials. The operator may be required to scan or enter in specific information about the specific product being picked in order to adequately update the ASRS inventory as well as record chain of custody information. Actively monitoring and controlling the order picking and inventory transfer processes may substantially reduce or eliminate the need for audits of the hub's inventory and may provide a complete record of all material movements of products within the system 10.

Changes and modifications in the specifically described embodiments can be carried out without departing from the principles of the present invention which is intended to be limited only by the scope of the appended claims, as interpreted according to the principles of patent law including the doctrine of equivalents.

The invention claimed is:

1. An automated warehouse system for climate controlled storage and order fulfilment, said automated warehouse system comprising:
   a warehouse control system controlling storage and order fulfilment processes in said automated warehouse system;
   an automated storage and retrieval system comprising a storage rack defining a plurality of storage locations for a plurality of storage receptacles for containing goods, said storage rack at least partially disposed in a frozen environment;
   a conveyor system coupled with said automated storage and retrieval system and operable to transport storage receptacles to and from said automated storage and retrieval system;
   a workstation in communication with said conveyor system and configured for picking goods received from said automated storage and retrieval system to a temperature-controlled order receptacle;
   wherein the warehouse control system is operable to direct order fulfilment operations comprising directing goods requiring stable temperature control from said automated storage and retrieval system to said workstation and operable to direct an operator at said workstation to pick the goods from the storage receptacle to said temperature-controlled order receptacle in a manner that maintains the goods within a temperature range required for those goods.

2. The automated warehouse system of claim 1, wherein said temperature-controlled order receptacle comprises a cooling system having at least one chosen from a thermoelectric pump, a forced ventilation system, a vapor-compression refrigeration system, and a temperature-controlled fluid distribution system.

3. The automated warehouse system of claim 2, wherein said cooling system comprises a controller adapted to control said cooling system based on the temperature at the interior of said temperature-controlled order receptacle.

4. The automated warehouse system of claim 1, wherein said storage rack comprises a plurality of racks each defining a plurality of storage locations for storage receptacles and wherein some of said racks are disposed in the frozen environment and some of said racks are disposed in an ambient environment.

5. The automated warehouse system of claim 4, wherein the warehouse control system is operable to direct order fulfilment operations comprising directing goods requiring stable temperature control from the frozen environment of said automated storage and retrieval system and goods from the ambient environment to said workstation and operable to direct an operator at said workstation to pick the temperature-controlled goods and the ambient goods from respective storage receptacles to said temperature-controlled order receptacles in a manner that maintains the temperature-controlled goods within a temperature range required for those goods.

6. The automated warehouse system of claim 1, wherein said automated storage and retrieval system comprises one chosen from an aisle based storage system, a grid storage system, and a carousel based storage system.

7. The automated warehouse system of claim 1, wherein each of the storage receptacles comprises a temperature sensor operable to communicate the temperature within the storage receptacles to the warehouse management system while the storage receptacle is stored in the automated storage and retrieval system and/or when the storage receptacle is moving through said automated warehouse system.

8. An automated warehouse system for storage of goods at different temperatures and having a warehouse control system controlling said system, said system comprising:
   an automated storage and retrieval system comprising a storage rack defining a plurality of storage locations; and
   a plurality of storage receptacles configured to be stored at storage locations in said automated storage and retrieval system;
   a temperature control system provided for each of said storage receptacles for monitoring and regulating temperature within each one of said storage receptacles, wherein each of said temperature control systems is individually controllable by the warehouse control system;

a conveyor system coupled with said automated storage and retrieval system and operable to transport storage receptacles to and from said automated storage and retrieval system;

a workstation in communication with said conveyor system and configured for picking goods out of said storage receptacles received from said automated storage and retrieval system to a temperature-controlled order receptacle;

wherein the warehouse control system is operable to maintain and adjust the temperature of each of said storage receptacles stored in said automated storage and retrieval system based on information received from the corresponding one of said temperature control systems, the warehouse control system is operable to maintain and adjust the temperature of each of said storage receptacles at different levels; and wherein the warehouse control system is operable to direct order fulfilment operations comprising directing said storage receptacles containing goods requiring stable temperature control from said automated storage and retrieval system to said workstation and operable to direct an operator at said workstation to pick the goods from the storage receptacle to said temperature-controlled order receptacle in a manner that maintains the goods within a temperature range required for those goods.

9. The automated warehouse system of claim 8, further comprising a communication network disposed throughout said automated storage and retrieval system and selectively engageable by one of said storage receptacles at each of said storage locations, wherein each of said storage receptacles is configured to selectively couple with said communication network when stored at one of said storage locations, and wherein the warehouse control system is operable to adjust the temperature of each of said storage receptacles via a connection between said communication network and each of said temperature control systems.

10. The automated warehouse system of claim 8, wherein at least some of the storage receptacles comprise an insulated body.

11. The automated warehouse system of claim 8, wherein said automated storage and retrieval system comprises one chosen from a grid storage system, an aisle based storage system, and a carousel based storage system.

12. A method for controlling an automated warehouse system having a warehouse control system, said method comprising:

storing goods in a plurality of storage receptacles in an automated storage and retrieval system having a plurality of storage locations for storing storage receptacles, wherein at least some of the storage receptacles stored at the storage locations are temperature-controlled for storage of goods requiring controlled temperatures;

monitoring the temperature of at least the temperature-controlled storage receptacles with the warehouse control system;

the warehouse control system directing an order picking process for a customer order requiring goods from at least one of the temperature-controlled storage receptacles, said directing an order picking process comprising:

transporting temperature-controlled storage receptacles having goods requiring controlled temperatures that are required for the customer order from the automated storage and retrieval system to a workstation;

an operator at the workstation picking the goods requiring controlled temperatures from the temperature-controlled storage receptacles to a temperature-controlled order receptacle in a manner that maintains the goods within a temperature range required for those goods; and transporting the goods for the customer order in the temperature-controlled order receptacle to downstream process in a manner that maintains the goods within a temperature range required for those goods.

13. The method of claim 12, wherein said transporting temperature-controlled storage receptacles having goods requiring controlled temperatures that are required for the customer order from the automated storage and retrieval system to a workstation comprises transporting the most fragile or temperature sensitive ones of the required goods after the less fragile or less temperature sensitive ones of the required goods.

14. The method of claim 12, further comprising the warehouse control system sequencing a plurality of customer orders requiring goods requiring controlled temperatures as a function of required delivery times at which the customer requires their order and/or route and transportation time planning requirements.

15. The method of claim 12, wherein said directing an order picking process further comprises transporting non-temperature-controlled receptacles having goods required for the customer order which do not require temperature control from the automated storage and retrieval system to the workstation and picking the goods which do not require temperature control from the non-temperature-controlled receptacles to the temperature-controlled order receptacle such that the temperature-controlled order receptacle contains both goods requiring temperature control and goods not requiring temperature control.

16. The method of claim 12, wherein once a customer order is fully picked into the temperature-controlled order receptacle, sealing the temperature-controlled order receptacle with a tamper-resistant device.

17. The method of claim 16, wherein after said sealing the temperature-controlled order receptacle, said method comprises alerting the customer of the status of their order and providing the customer with real-time tracking information of their order.

18. The method of claim 12, wherein said transporting the goods in the temperature-controlled order receptacle to downstream process comprises transporting the temperature controlled order receptacle to a medical facility that is remote from the automated warehouse system.

19. The method of claim 12, wherein the automated warehouse system comprises at least one chosen from:

(i) individually environmentally controllable storage receptacles in which the internal temperature of the storage receptacles are configured to be monitored and adjusted; and (ii) at least a portion of the automated storage and retrieval system is disposed in a frozen environment that is temperature-controlled.

20. The method of claim 12, wherein at least some of the goods handled in the automated warehouse system comprise pharmaceuticals.

* * * * *